Patented Apr. 10, 1928.

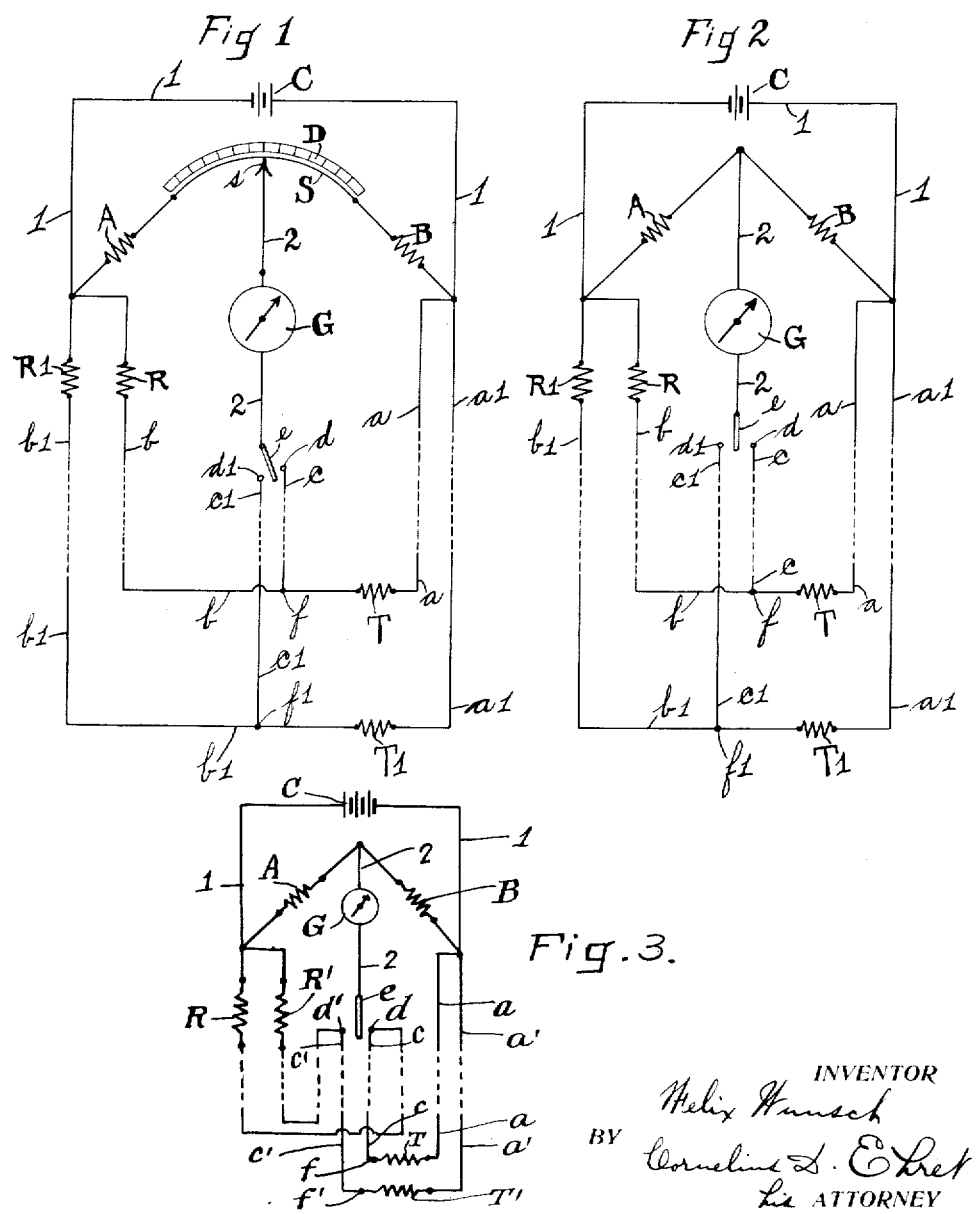

1,665,397

UNITED STATES PATENT OFFICE.

FELIX WUNSCH, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

ELECTRICAL MEASURING APPARATUS.

Application filed May 9, 1923. Serial No. 637,711.

My invention relates to electrical measuring apparatus involving a Wheatstone bridge for measuring a plurality of unknown resistances or equivalents.

In accordance with my invention, a plurality of unknown resistances are associated in or with a Wheatstone bridge with switching mechanism for bringing the unknown resistances individually into such relation as to permit measurement of their resistances, the switching mechanism being so located or related to the bridge that the resistances of contacts between the switch elements introduce no error and have no effect upon the measurements.

In accordance with my invention, there co-act with each of the unknown resistances three leads, variations in resistance of the lead of each unknown resistance in the same bridge arm therewith being compensated by the other leads co-acting with the same unknown resistance, one of said other leads being in a conjugate conductor of the bridge, and the aforesaid switching mechanism connecting these leads individually in said conjugate conductor for bringing the associated unknown resistances into relation with the bridge for effecting their measurement.

My invention resides in apparatus of the character hereinafter described and claimed.

For an illustration of some of the many forms my invention may take, reference is had to the accompanying drawing, in which:

Fig. 1 is a diagrammatic view of a Wheatstone bridge arrangement embodying my invention and utilizable for making measurements by the null method.

Fig. 2 is a diagrammatic view of a Wheatstone bridge arrangement embodying my invention and utilizable for making measurements by the deflection method.

Fig. 3 is a diagrammatic view of a modification.

Referring to Fig. 1, A and B are fixed resistances, preferably of zero temperature co-efficient, disposed, respectively, in the two ratio arms of the bridge which includes also such portions of the slide wire S, preferably of zero temperature co-efficient, as lie on opposite sides of the movable contact $s$ which slides upon and contacts with the slide wire S. The conjugate conductor 1, including the source of current C, connects the remote terminals of the ratio arms. The third arms of the bridge include, respectively, the unknown or thermometer resistances $T$, $T^1$, etc., of any number, and in series with the third arms of the bridge are the fourth arms of the bridge including, respectively, the fixed resistances R, $R^1$, etc., preferably of zero temperature co-efficient, correlated, respectively, with the unknown resistances $T$, $T^1$, etc. Included in the third arms, respectively, are the leads $a$, $a^1$, etc., connecting the different unknown resistances $T$, $T^1$, etc., permanently or without contact resistance with one terminal of the ratio arm including the resistance B. Similarly, included in the fourth arms, respectively, are the leads $b$, $b^1$, etc., connecting the different correlated resistances R, $R^1$, etc., with their unknown resistances $T$, $T^1$, etc. There are provided for the third and fourth arm groups conjugate conductor leads $c$, $c^1$, etc., connected, respectively, with switch contacts $d$, $d^1$, etc., with which co-acts the movable switch contact $e$ at one end of the second conjugate conductor 2, including the galvanometer G, and whose other end terminates at the aforesaid slide wire contact $s$.

The switch contacts $d$, $d^1$, etc., are therefore connected with the junctions $f$, $f^1$, etc., of the third and fourth arms.

The third and fourth arm groups or paths are accordingly permanently connected, in parallel with each other, across the terminals of the source of current C, the current from the source C dividing among the several parallel third and fourth arm circuits, the source of current C being of a capacity or magnitude such that the current in any one third and fourth arm path is independent of the magnitudes of currents simultaneously existing in the other third and fourth arm paths. In any event, the relation is such that any one third and fourth arm path is independent of effect by any other of the third and fourth arm paths, in the sense that the measurement of any one unknown resistance may be made by throwing the switch contact $e$ on to the proper stationary switch contact and adjusting the movable contact $s$ along the slide wire S to such point that the deflection of the galvanometer G is zero, whereupon the magnitude of the unknown resistance, or its temperature, if it be a thermometer resistance, may be read upon the scale D opposite the contact s.

Thus, to determine the magnitude of the resistance T, the switch contact e is brought into engagement with the switch contact d, and the contact s moved along the slide wire S until the deflection of the galvanometer G is zero, whereupon the resistance or the temperature of the resistance T may be read upon the scale D.

The switch being in a conjugate conductor, the resistance at the contact between the switch members d and e has no effect upon the measurement, and therefore the apparatus or system as a whole is independent of switch contact resistances or variation of contact resistances in the switching mechanism utilized to bring the different unknown resistances into operative relation with the bridge for effecting measurement.

Similarly, when the magnitudes of the other unknown resistances are to be determined, the switch e is brought into engagement with the proper switch contact, as $d^1$, etc., associated with the particular unknown resistance to be measured.

By utilizing the switching mechanism in a conjugate conductor, and by connecting the different third and fourth arm paths permanently to the remote terminals of the ratio arms, any number of unknown resistances may be associated with or in the same bridge, and variations of resistance in any one third and fourth arm path will have no effect upon the measurement of the unknown resistance in another third and fourth arm path.

The arrangement is in general the same in Fig. 2, except, however, that the slide wire S is not employed and the galvanometer G is utilized as a deflection instrument, the magnitude of the unknown resistance, or its temperature, being determined from the extent of deflection of the galvanometer G when the switch contact e is brought into engagement with that stationary switch contact which is associated with the unknown resistance to be measured.

In the arrangement of both Figs. 1 and 2, the employment of the leads $b$, $b^1$, etc. in the fourth arms of the bridge serves to compensate for the leads or variation of resistances of the lead $a$, $a^1$, etc. in the third arms of the bridge.

In case the advantage of the leads $b$, $b^1$, etc. may be unimportant, such leads $b$, $b^1$, etc. may, as indicated by Fig. 3, be omitted, and the lower terminals of the resistances R, $R^1$, etc. connected, respectively, to the switch contacts $d$, $d^1$, the leads $a$, $a^1$, etc. and $c$, $c^1$, etc. being retained. It will be understood that my invention is applicable also to the case where the unknown resistances are not at a distance from the bridge, in which event the leads $a$, $a^1$, etc., $c$, $e^1$, etc. and $b$, $b^1$, etc. are omitted or in effect shortened to mere connections within the bridge.

Inasmuch as the arrangement in Fig. 1 is utilized in a null method, variations of voltage of the source C have no effect upon the measurements.

In an arrangement such as indicated in Fig. 2, for a deflection method, the deflections of the galvanometer G will depend upon the voltage of the source C, but by choosing for C a source of current of constant or substantially constant voltage, there is no or substantially no error as regards the nature of the source C.

It will be understood with respect to all arrangements disclosed that the source C and galvanometer G may be interchanged, as by including the source C in the conjugate conductor 2 and the galvanometer G in the conjugate conductor 1.

As regards all the arrangements described, the source C may deliver either direct, fluctuating or alternating current, the galvanometer G being in each instance of a character utilizable with the nature of current employed.

In all arrangements, the source C may be a battery or direct current dynamo-electric machine, and when a source of alternating current may be an alternating current generator.

In all arrangements, the source C may be, for example, a commercial lighting or power circuit, delivering either alternating or direct current at 110 volts, or any other suitable voltage.

While the devices T, $T^1$, etc. have been referred to as unknown or thermometer resistances, such as non-inductive or non-reactive resistances, it shall be understood that by the terms "resistance" and "unknown resistance" as herein employed and as employed in the appended claims, there are included not only non-inductive or non-reactive resistances, such as resistance conductors and electrolytic resistances, but also inductive resistances or reactances and condensers or capacitative reactances, it being understood that when the resistances and unknown resistances are reactive, as when consisting of inductive resistances or condensers, or when electrolytic in nature, the source of current C will preferably be of a nature delivering fluctuating or alternating current.

The devices A and B in the ratio arms and the devices R, $R^1$, etc. will be non-reactive, reactive or electrolytic in character, as may be suitable or necessary properly to coact with the devices T, $T^1$, etc.

What I claim is:

1. A Wheatstone bridge comprising ratio arms, a plurality of third and fourth arm paths permanently connected with said ratio arms, and conjugate conductors, there being an unknown resistance in each third arm path, and switching mechanism in one of said conjugate conductors for connecting it with any third and fourth arm junction.

2. A Wheatstone bridge comprising ratio arms, a plurality of third and fourth arm paths permanently connected with said ratio arms, and conjugate conductors, there being an unknown resistance in each third arm path and a correlated resistance in each fourth arm path and switching mechanism in one of said conjugate conductors for connecting it with any third and fourth arm junction.

3. A Wheatstone bridge comprising ratio arms, a plurality of third and fourth arm paths, and conjugate conductors, there being an unknown resistance in each third arm path and a correlated resistance in each fourth arm path, a galvanometer, and switching mechanism in one of said conjugate conductors for connecting it with any third and fourth arm junction.

4. A Wheatstone bridge comprising ratio arms, a plurality of third and fourth arm paths permanently connected with said ratio arms, and conjugate conductors, there being an unknown resistance in each third arm, and a lead in each third arm, a conjugate conductor lead connecting with each third and fourth arm junction, and switching mechanism for connecting said conjugate conductor leads in one of said conjugate conductors.

5. A Wheatstone bridge comprising ratio arms, a plurality of third and fourth arm paths, and conjugate conductors, there being an unknown resistance in each third arm, a correlated resistance in each fourth arm and a lead in each third arm, a conjugate conductor lead connecting with each third and fourth arm junction, and switching mechanism for connecting said conjugate conductor leads in one of said conjugate conductors.

6. A Wheatstone bridge comprising ratio arms, a plurality of third and fourth arm paths permanently connected with said ratio arms, and conjugate conductors, there being an unknown resistance in each third arm, a correlated resistance in each fourth arm and a lead in each third arm, a conjugate conductor lead connecting with each third and fourth arm junction, and switching mechanism for connecting said conjugate conductor leads in one of said conjugate conductors.

7. A Wheatstone bridge comprising ratio arms, a plurality of third and fourth arm paths permanently connected with said ratio arms, and conjugate conductors, there being an unknown resistance in each third arm and a lead in each third and fourth arm, a conjugate conductor lead connecting with each third and fourth arm junction, and switching mechanism for connecting said conjugate conductor leads in one of said conjugate conductors.

8. A Wheatstone bridge comprising ratio arms, a plurality of third and fourth arm paths permanently connected with said ratio arms, and conjugate conductors, there being an unknown resistance in each third arm, a correlated resistance in each fourth arm and a lead in each third and fourth arm, a conjugate conductor lead connecting with each third and fourth arm junction, and switching mechanism for connecting said conjugate conductor leads in one of said conjugate conductors.

9. A Wheatstone bridge comprising ratio arms, a plurality of third and fourth arm paths, and conjugate conductors, there being an unknown resistance in each third arm, a correlated resistance in each fourth arm and a lead in each third and fourth arm, a conjugate conductor lead connecting with each third and fourth arm junction, and switching mechanism for connecting said conjugate conductor leads in one of said conjugate conductors.

10. A Wheatstone bridge comprising ratio arms, a plurality of third arm paths permanently connected with one of said ratio arms, and conjugate conductors, there being an unknown resistance in each third arm and a lead in each third arm, a conjugate conductor lead for each third arm connecting therewith at its end opposite to its aforesaid connection with said one of said ratio arms, and switching mechanism for connecting any one of said conjugate conductor leads in one of said conjugate conductors.

11. A Wheatstone bridge comprising ratio arms, a plurality of third arm paths permanently connected with one of said ratio arms, and conjugate conductors, the junction of said ratio arms being fixed and connected with one of said conjugate conductors, there being an unknown resistance in each third arm, a deflection instrument in one of said conjugate conductors, and switching mechanism in one of said conjugate conductors for connecting it with any third arm at its end opposite to its aforesaid connection with said one of said ratio arms.

12. A Wheatstone bridge comprising ratio arms, a plurality of third and fourth arm paths, and conjugate conductors, the junction of said ratio arms being fixed and connected with one of said conjugate conductors, a deflection galvanometer in one of said conjugate conductors, there being an unknown resistance in each third arm and a resistance in each fourth arm, and switching mechanism in one of said conjugate conductors for connecting it with any third and fourth arm junction.

13. A Wheatstone bridge comprising ratio arms, a plurality of third arm paths permanently connected with one of said ratio arms, and conjugate conductors, the junction of the ratio arms being fixed and connected with one of said conjugate conductors, a deflection instrument in one of said conjugate conductors, a lead in each third arm, a conjugate conductor lead for each third arm connecting therewith at its end opposite to its aforesaid connection with said one of said ratio arms, and switching mechanism for connecting any one of said conjugate conductor leads in one of said conjugate conductors.

14. A Wheatstone bridge comprising ratio arms, a plurality of third and fourth arm paths, and conjugate conductors, the junction of the ratio arms being fixed and connected with one of said conjugate conductors, a deflection instrument in one of said conjugate conductors, there being an unknown resistance in each third arm, a correlated resistance in each fourth arm and a lead in each third and fourth arm, conjugate conductor leads connecting with each third and fourth arm junction, and switching mechanism for connecting said conjugate conductor leads in one of said conjugate conductors.

FELIX WUNSCH.

Certificate of Correction.

Patent No. 1,665,397.     Granted April 10, 1928, to
FELIX WUNSCH.

It is hereby certified that error appears in the printed specification of the above-numbered patent requiring correction as follows: Page 1, line 47, for the word "includes" read *include;* page 2, line 54, for the word "lead" read *leads*, and line 66, for "$e^1$" read $c^1$; page 3, line 11, claim 2, after the word "path" insert a comma; and line 27, claim 4, after the word "arm" strike out the comma; and that the said Letters Patent should be read with these corrections therein that the same may conform to the record of the case in the Patent Office.

Signed and sealed this 22nd day of May, A. D. 1928.

[SEAL.]     M. J. MOORE,
*Acting Commissioner of Patents.* manently connected with one of said ratio arms, and conjugate conductors, the junction of the ratio arms being fixed and connected with one of said conjugate conductors, a deflection instrument in one of said conjugate conductors, a lead in each third arm, a conjugate conductor lead for each third arm connecting therewith at its end opposite to its aforesaid connection with said one of said ratio arms, and switching mechanism for connecting any one of said conjugate conductor leads in one of said conjugate conductors.

14. A Wheatstone bridge comprising ratio arms, a plurality of third and fourth arm paths, and conjugate conductors, the junction of the ratio arms being fixed and connected with one of said conjugate conductors, a deflection instrument in one of said conjugate conductors, there being an unknown resistance in each third arm, a correlated resistance in each fourth arm and a lead in each third and fourth arm, conjugate conductor leads connecting with each third and fourth arm junction, and switching mechanism for connecting said conjugate conductor leads in one of said conjugate conductors.

FELIX WUNSCH.

Certificate of Correction.

Patent No. 1,665,397.                      Granted April 10, 1928, to
FELIX WUNSCH.

It is hereby certified that error appears in the printed specification of the above-numbered patent requiring correction as follows: Page 1, line 47, for the word "includes" read *include;* page 2, line 54, for the word "lead" read *leads*, and line 66, for "$e^1$" read $c^1$; page 3, line 11, claim 2, after the word "path" insert a comma; and line 27, claim 4, after the word "arm" strike out the comma; and that the said Letters Patent should be read with these corrections therein that the same may conform to the record of the case in the Patent Office.

Signed and sealed this 22nd day of May, A. D. 1928.

[SEAL.]                                          M. J. MOORE,
*Acting Commissioner of Patents.*